United States Patent Office 3,556,882
Patented Jan. 19, 1971

3,556,882
METHOD OF RENDERING THERMOPLASTICS RECEPTIVE TO COATINGS
David H. Fishman, West Orange, and Harry T. Hanson, Union, N.J., assignors to Celanese Corporation, New York, N.Y., a corporation of Delaware
No Drawing. Filed July 13, 1967, Ser. No. 653,042
Int. Cl. B44c 1/092
U.S. Cl. 156—2                                        4 Claims

ABSTRACT OF THE DISCLOSURE

Disclosed herein is a description of a new and improved process for etching thermoplastic resins to prepare the surface of such resins for painting or other coating.

---

This invention relates to a new process for preparing the surface of thermoplastic resins to be receptive for painting or other forms of coatings.

DESCRIPTION OF THE PRIOR ART

It is well known that articles fabricated from acetal resins and other thermoplastics are not usually receptive to painting, adhesives or the like, which are applied to the surface of the resin in order to provide ornamentation or protection. Frequently the method of fabrication provides a smooth, glossy surface which makes it even more difficult to promote adhesion with various coatings. In the past, plastic materials have been treated in various ways including etching, dissolving, flaming or melting the surface so as to improve the adhesive properties in the surface layer of the resin material.

Recently a new process was disclosed in U.S. Pat. No. 3,235,426. According to the allegations made in the specification of that patent, the new process results in a stronger bond between the paint and the resin, particularly with regard to the treatment of acetal resins and polyamide resins. In accordance with the disclosure of that patent, the new process comprises immersing a thermoplastic resin article in a solid-in-liquid dispersion, which is an acidic etching medium, at a temperature of from 30° to 120° C., preferably 80° to 100° C. for a brief period of time usually 5 to 60 seconds, and thereafter removing the article from the etching medium and baking or drying it in a gaseous atmosphere at a temperature of from 50° to 200° C. and preferably at a temperature of from 100° to 150° C., for another brief period of time, usually 5 to 60 seconds. Following this treatment the residues of the etching medium are removed by washing with a suitable solvent. In accordance with the teaching of the specification, the etching agent used in that process must be a compound capable of rapidly corroding the thermoplastic resins at ordinary temperatures and pressures. Moreover it appears that a baking step must be employed in order to obtain good results; or, in other words, after the article is removed from the etching medium, it must be maintained in a gaseous atmosphere at a temperature of from 50° to 200° C. for a brief period of time.

SUMMARY OF INVENTION

It has now been discovered that the baking step can be eliminated by etching the material at a temperature of from about 145° C. to about 185° C., controlling the immersion time, and utilizing a water-soluble, high-boiling solvent such as ethylene glycol. The higher temperature also permits the use of certain acidic surfactants which are relatively weak acids at ambient temperatures but strong etching agents at elevated temperatures. The use of these materials in turn obviates the necessity of adding separate surfactants to the system.

A wide variety of thermoplastics may be treated in accordance with the general process of this invention, for example, polyesters, polyamides and polyacetals. The process is particularly well suited to the treatment of polyamide resins and acetal resins. The acetal resins contemplated for use in this invention are the addition homopolymers, copolymers, terpolymers, and the interpolymers of aldehydes such as formaldehyde and cyclic polymers such as trioxane. Two of the acetal resin materials that are available commercially are "Celcon" acetal coploymer (Celanese Corporation) and "Delrin" acetal resin (E. I. du Pont de Nemours & Co.). Celcon is described and claimed in U.S. Pat. No. 3,027,352.

The etching medium which is employed in the process of this invention is a dispersion of solids-in-liquid. The etching medium comprises the etching agent, a solvent for the etching agent and dispersed solid particles. If the preferred etching agent is utilized, there is no need to include an additional surface tension depressing agent in order to permit the medium to wet the article being treated.

In accordance with the instant invention the material is etched at an elevated temperature of from 145° C. to about 185° C. In addition, however, the immersion time must be controlled. The immersion time should be in the range of from 10 to 90 seconds, preferably from 20 to 50 seconds. By using elevated temperatures, by controlling the immersion time, and by utilizing a solvent that is soluble in water or some other readily available inexpensive material, one finds that it is not necessary to bake the article after it has been etched. As shown hereinafter the prior art process required an oven bake or drying step following the etching procedure. This bake was needed in part to remove the solvent that was used in the etching bath.

The use of the higher temperature also permits the use of certain acidic surfactants which, although not capable of rapidly corroding a thermoplastic resin at ordinary temperatures and pressures, are suitable etching agents at the elevated temperatures. Moreover these acidic surfactants depress the surface tension of the system to permit the medium to wet the article being treated. The use of these agents obviates the necessity of adding a separate surfactant to the system. A variety of acidic surfactants may be employed. The preferred acidic surfactant is referred to as GAFAC RE–960 and is sold by the General Aniline & Film Corporation. This material is a mixture of compounds with the following structure being the average compound:

$$C_9H_{19}-C_6H_4O-(CH_2CH_2O)_{50}/(PO_3H_2)_5$$

Other suitable acidic surfactants include:
Ultraphos 11, Ultraphos 12, and Ultraphos 17 sold by Witco Chemical Company, Zonyl S–13 sold by the E. I. du Pont de Nemours & Co., perfluoro phosphates manufactured by the Minnesota Mining & Mfg. Co. e.g. FC–95 and FC–98, and certain phosphates designated QS–44 and QS–5 sold by Rhom & Haas. These acidic surfactants are particularly useful in the instant invention because they do not decompose as readily as many organic acids at the high temperatures contemplated by this invention.

Strong acids such as mineral acids, carboxylic acids, and sulfonic acids may also be employed. If the temperature is maintained as described above, the baking step can still be eliminated. It is preferred, however, that the aforementioned acidic surfactants be employed.

The amount of etching agent required will to some extent depend upon the strength of the agent. Generally, however, the amount of etching agent will be in the range of from 0.01 to 50% by weight of the liquid portion of the etching medium. In the case of the preferred etching agents, the acid surfactants, the preferred amount is from 20 to 40% of the liquid portion of the etching medium.

A solvent must be employed for the etching agent. This solvent also provides a continuous phase in which the inert solid particles are dispersed. If the inherent wetting capacity of the solvent is not great enough and if the preferred acidic surfactants are not employed, there may of course be additional surface tension depressing agents employed. The solvent used in the process of this invention must have an atmospheric boiling point of at least 145° C., preferably at least 200° C. It must also be a solvent for the etching agent and it should be soluble in a readily available material such as water. Ethylene glycol is a preferred solvent for this invention. Other suitable solvents comprise: diethylene glycol dimethyl ether, diethylene glycol diethyl ether, ethylene glycol monobutyl ether, tetraethylene glycol dimethyl ether, diethylene glycol monomethyl ether.

The amount of sovent to be employed is from about 99.9 to 50 percent preferably from 99.9% to 85%. The dispersed solid particles are important to the process of this invention in attaining a uniform etching pattern and in achieving other benefits. The solids must be insoluble in, and inert to, the etching medium, and the solids must be in the form of fine particles. Any size smaller than about 40 mesh is operable, although it appears that smaller particle sizes, e.g., smaller than 100 mesh, are preferable. The solids which have been found to be operable in the process of this invention include a wide variety of materials since inertness, insolubility, and size are the main qualifications to be considered. The solids known to be especially desirable include the diatomaceous earths (kieselguhrs), such as "Dicalite," manufactured by Great Lakes Carbon Corp., "Super Floss" and "Celite," manufactured by Johns-Manville Corp., minerals of a high silica content such as quartz, "Cab-O-Sil," manufactured by Cabot Corporation, and "Hi-Sil," manufactured by Columbia Southern Chemical Co.; and various clays such as attapulgite, kaolinite, and bentonite. As mentioned, this is intended to be only a representative listing which can be supplemented by the many other materials known to those skilled in the art.

As mentioned hereinbefore, the U.S. Patent No. 3,235,426 suggests treating thermoplastics with an acidic etching medium comprising a solid liquid dispersion. The following example shows that it is necessary to bake or dry the thermoplastic object following the etching procedure taught and claimed by that patent.

Example I

A dispersion of solids-in-liquid was prepared having the following composition in parts by weight:

| Component: | Parts |
|---|---|
| p-Toluene sulfonic acid | .3 |
| Dioxane | 3.0 |
| Cab-O-Sil | .5 |
| Tetrachloroethylene | 96.2 |

Samples of Celcon M90-01 acetal copolymer and Delrin 550 were immersed in the bath at 113° C. for 5, 30 and 60 second intervals. Samples were then either water quenched and washed well or oven-baked at 120° C. for 60 seconds and then washed. They were painted and tested for adhesion both immediately and after 10-day water immersion at 90° F. Table I summarizes the results.

TABLE I

| Bath immersion (secs.) | Water quench/wash | | Oven bake | |
|---|---|---|---|---|
| | Immediate adhesion | 10 day water | Immediate adhesion | 10 day water |
| Celcon, 5 secs | Good | Very poor | Excellent | Good. |
| Celcon, 30 secs | do | do | do | Excellent. |
| Celcon, 60 secs | Very poor | (Not run) | do | Do. |
| Delrin, 5 secs | Good | Fair | do | Do. |
| Delrin, 30 secs | Poor | Very poor | do | Do. |
| Delrin, 60 secs | Very poor | (Not run) | do | Do. |

Excellent results were obtained both for immediate adhesion and for the 10 day test in those instances where the oven bake or drying step was employed. It is seen, however, that those samples that were immediately water quenched and washed yielded very poor results.

The following examples show the efficacy of the instantly claimed invention. It will be noted that excellent adhesion can be obtained using the instant invention without the need of another bake or drying step.

Example II

A dispersion of solids in liquid was prepared having the following composition in parts by weight:

| Component: | Parts |
|---|---|
| General Aniline and Film—GAFAC RE–960 | 150 |
| Bis(2(2-methoxy ethoxy) ethyl) ether | 300 |
| Cab-O-Sil, M–5 | 0.7 |

Panels of Celcon M 90-01 acetal copolymer were immersed in the bath at 165° C. for 10, 20, 30 and 40 seconds. After withdrawing the panels from the dispersion they were washed well with water, then with perchloroethylene and allowed to dry. These were then painted with a conventional metal primer. Also painted were control panels including Delrin 500 panels which were treated as in Example I with an oven bake, and untreated control panels of Celcon M 90-01 acetal copolymer and Delrin 500. All the painted samples were cured at 132° C. for 30 minutes, allowed to cool to room temperature and then tested for paint adhesion. Two tests were performed: "The Scotch Tape Test" where the painted surface is scored with a razor blade cutting through the parallel lines at about 1/16 inch apart to give a pattern. Scotch tape was applied over the scored area with manual pressure and quickly peeled off. If no paint was removed the surface was considered to have passed the test. In the "nickel test" a nickel was manually run along the surface to be tested in an attempt to dislodge the paint. If no plastic surface was exposed, the sample was considered to have passed the test.

As expected, the untreated Celcon and Delrin panels had very poor paint adhesion. Also as expected, the Delrin panel treated in accordance with Example I with an oven bake had excellent paint adhesion. The Celcon panels treated in accordance with this invention had only fair adhesion for an immersion of 10 seconds. Very good adhesion was obtained for immersion times of 20 and 30 seconds, and excellent adhesion was obtained for an immersion time of 40 seconds. These results were obtained without the use of a baking step.

Example III

A dispersion of solids-in-liquids was prepared having the following composition in parts by weight:

| Component: | Parts |
|---|---|
| GAFAC-RE-960 | 80 |
| Ethylene glycol | 280 |
| Cab-O-Sil, M–5 | 0.7 |

The bath temperature was raised to 160° C. and samples of Celcon M 90-01 acetal copolymer and Delrin 500 were immersed for 30 and 35 second intervals. The panels were then washed and allowed to dry, primed and adhesion tested along with the sample of primed Celcon which had been etched using the process of Example I with the oven bake. An additional group of similarly etched and primed Celcon and Delrin samples was immersed in distilled water and maintained at 90° F. for 10 days. After drying, the samples were examined closely for surface defects and adhesion tested. Two tests were performed on each sample: tht Scotch tape test and the nickel test described in Example II. In order to convert this test from a purely qualitative to a quantitative test, numbers were assigned to the results on a scale of from one to ten. The lower the number the better the results. In Table II, the number to the left of the slash represents the results of the Scotch tape test and the number to the right of the slash indicates the results of the nickel test. The control used was Celcon etched in accordance with Example I with an oven bake. As is seen in Table II the adhesion rating for the initial adhesion was two for the Scotch tape test and two for the nickel test. After ten days the rating assigned to the control was from two to three for the Scotch tape test and three for the nickel test. It is seen in Table II that the samples treated in accordance to the instant invention, that is, without an oven bake, compared favorably with the control which was prepared with the oven bake.

TABLE II.—ADHESION TESTS

| Sample | Etching treatment | Adhesion rating | | Surface appearance |
| --- | --- | --- | --- | --- |
| | | Initial | After 10 days under water | |
| Celcon control. | Example I with oven bake. | 2/2 | 2-3/2 | Excellent. |
| Celcon | None | 5/6 | 8/8 | |
| Delrin | do | 8/8 | 8/8 | |
| Do | 160° C. bath, 30 secs | 2-3/2 | 2-3/3 | Do. |
| Do | 160° C. bath, 35 secs | 2/2 | 2/3 | Do. |
| Celcon | 160° C. bath, 30 secs | 2-3/2-3 | 2-3/3-4 | Do. |
| Do | 160° C. bath, 35 secs | 2/2-3 | 2-3/3-4 | Do. |

It is to be understood that the foregoing detailed description is given merely by way of illustration and that many variations may be made therein without departing from the spirit of the invention.

The embodiment of the invention in which an exclusive property or privilege is claimed are defined as follows:

1. A method of preparing the surface of an acetal resin selected from the group consisting of oxymethylene homopolymers and copolymers to receive coatings, which method comprises contacting said surface with a solid in liquid dispersion at a temperature of at least 145° C., said dispersion comprising:

(1) from 99.9 to 85% of a continuous liquid phase comprising a major portion of a water-soluble solvent having an atmospheric boiling point of at least 145° C. and containing from 20 to 40% by weight of an acidic surfactant selected from the group consisting of organic phosphates and organic perfluorophosphates capable of etching said surface at said temperature; and (2) from 0.1 to 15% by weight of a discontinuous solid phase consisting essentially of a particulate solid material which is insoluble in, and inert to, said liquid phase and has a particle size of less than 40 mesh; and removing said surface from contact with said dispersion.

2. A process according to claim 1 wherein said acetal resin is immersed in said dispersion for from 10 to 90 seconds and is then immediately washed.

3. A process according to claim 1 wherein said water-soluble solvent is ethylene glycol.

4. A process according to claim 1 wherein said water-soluble solvent is bis(2(2-methoxy ethoxy)ethyl) ether.

References Cited

UNITED STATES PATENTS 3,235,426  2/1966  Bruner _____ 156—2

JACOB A. STEINBERG, Primary Examiner

U.S. Cl. X.R.

156—3; 117—47; 252—794